United States Patent
Lindoff et al.

(10) Patent No.: US 9,729,304 B2
(45) Date of Patent: Aug. 8, 2017

(54) METHODS AND DEVICES FOR RADIO COMMUNICATION CONFIGURATION

(71) Applicant: Telefonaktiebolaget L M Ericsson (publ), Stockholm (SE)

(72) Inventors: Bengt Lindoff, Bjarred (SE); Christian Bergljung, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 104 days.

(21) Appl. No.: 14/430,227

(22) PCT Filed: Jun. 27, 2013

(86) PCT No.: PCT/EP2013/063491
§ 371 (c)(1),
(2) Date: Mar. 22, 2015

(87) PCT Pub. No.: WO2014/048596
PCT Pub. Date: Apr. 3, 2014

(65) Prior Publication Data
US 2015/0249531 A1    Sep. 3, 2015

Related U.S. Application Data

(60) Provisional application No. 61/706,431, filed on Sep. 27, 2012.

(51) Int. Cl.
*H04L 5/14* (2006.01)
*H04W 72/04* (2009.01)
(Continued)

(52) U.S. Cl.
CPC .............. *H04L 5/14* (2013.01); *H04L 1/1812* (2013.01); *H04L 5/0057* (2013.01);
(Continued)

(58) Field of Classification Search
CPC ...................................................... H04L 5/14
See application file for complete search history.

(56) References Cited

U.S. PATENT DOCUMENTS

2009/0059820 A1* 3/2009 Jung ................. H04L 5/003
370/280
2009/0285139 A1  11/2009 Bhattad et al.
(Continued)

FOREIGN PATENT DOCUMENTS

EP    2 247 132 A1    11/2010
GB    2 431 073 A      4/2007
(Continued)

OTHER PUBLICATIONS

PCT International Search Report, mailed Dec. 10, 2013, in connection with International Application No. PCT/EP2013/063491, all pages.
(Continued)

*Primary Examiner* — John Blanton
(74) *Attorney, Agent, or Firm* — Leffler Intellectual Property Law, PLLC

(57) ABSTRACT

The teachings present a method performed in a network node for configuring a device for radio communication in uplink and downlink between the network node and the device. The method comprises: configuring the device with a primary cell on a first radio channel at a first carrier frequency f1 with a first frequency bandwidth B1 for time division duplexed communication in uplink and downlink; configuring the device with a secondary cell on a second radio channel at a second carrier frequency f3 with a second frequency bandwidth B3, wherein the secondary cell is adjacent to the primary cell and configured for downlink communication only; and configuring the device to support and to monitor the second radio channel, the configuration comprising a priority list according to which the device is to
(Continued)

perform the monitoring. The teachings also disclose corresponding network node, methods in a device, and corresponding devices.

12 Claims, 12 Drawing Sheets

(51) Int. Cl.
*H04L 1/18* (2006.01)
*H04L 5/00* (2006.01)
*H04W 8/24* (2009.01)

(52) U.S. Cl.
CPC ..... *H04W 72/042* (2013.01); *H04W 72/0413* (2013.01); *H04W 72/0446* (2013.01); *H04W 72/0453* (2013.01); *H04W 8/245* (2013.01)

(56) References Cited

U.S. PATENT DOCUMENTS

| | | | | |
|---|---|---|---|---|
| 2010/0034160 | A1* | 2/2010 | Prakash | H04W 68/02 370/329 |
| 2010/0281486 | A1* | 11/2010 | Lu | H04W 72/1247 718/104 |
| 2011/0211489 | A1 | 9/2011 | Chung et al. | |
| 2011/0286370 | A1 | 11/2011 | Tang et al. | |
| 2013/0077581 | A1* | 3/2013 | Lee | H04L 25/0204 370/329 |
| 2014/0038588 | A1* | 2/2014 | Ljung | H04W 52/0216 455/422.1 |
| 2014/0192687 | A1* | 7/2014 | Kim | H04L 5/001 370/280 |
| 2015/0223241 | A1* | 8/2015 | Cattoni | H04L 5/0044 370/329 |

FOREIGN PATENT DOCUMENTS

| | | |
|---|---|---|
| WO | 2008/032560 A1 | 3/2008 |
| WO | 2008/035287 A2 | 3/2008 |
| WO | 2008/105718 A1 | 9/2008 |
| WO | 2011/079579 A1 | 7/2011 |

OTHER PUBLICATIONS

International Preliminary Report on Patentability, mailed Oct. 7, 2014, in connection with International Application No. PCT/EP2013/063491, all pages.

Alcatel-Lucent et al. "On synchronized new carriers" 3GPP Draft R1-121231, TSG-RAN WG1 Meeting #68bis, Mar. 26-30, 2012, Jeju, Korea, pp. 1-3, XP050599525.

Ericsson et al. "Proposed framework for specification of the DL-only band in 36.101" 3GPP Draft R4-115689, TSG-RAN WG 4 (Radio) Meeting #61, Nov. 14-18, 2011, San Francisco, CA, USA, pp. 1-5, XP050567409.

New Postcom "CA with different TDD configurations" 3GPP Draft R2-114119, TSG-RAN WG2 Meeting #75, Aug. 22-26, 2011, Athens, Greece, pp. 1-3.

Samsung "Cell specific TDD configuration Inter-band Carrier Aggregation" 3GPP Draft R2-116132, TSG-RAN WG2 Meeting #76, Nov. 14-18, 2011, San Francisco, CA, USA, pp. 1-3.

* cited by examiner

METHODS AND DEVICES FOR RADIO COMMUNICATION CONFIGURATION

CROSS-REFERENCE TO RELATED APPLICATIONS

This application claims the benefit of U.S. Provisional Application No. 61/706,431, filed Sep. 27, 2012, which is hereby incorporated herein by reference in its entirety.

FIELD OF THE INVENTION

The technology disclosed herein relates generally to the field of wireless communication, and in particular to uplink and downlink configurations in wireless communication systems.

BACKGROUND

In a typical communications network, also referred to as e.g. a wireless communications network, a wireless communications system, a communications network or a communications system, a device, communicates via a Radio Access Network (RAN) to one or more Core Networks (CNs).

The device is a device by means of which a subscriber may access services offered by an operator's network and services outside, i.e. external to, the operator's network to which the operators radio access network and core network provide access, e.g. access to the Internet. The device may be any device, mobile or stationary, enabled to communicate over a radio channel in the communications network. The devices are enabled to communicate wirelessly with the network. The communication may be performed e.g. between two devices, between devices and a regular (landline) telephone and/or between the devices and a server via the radio access network and possibly one or more core networks and possibly the Internet.

The communications network covers a geographical area which may be seen as divided into cell areas, with each cell area being served by a network node. The network node may be referred to as a base station, e.g. a Radio Base Station (RBS), which in some communications networks is also called evolved NodeB (eNB), NodeB, B node or base station. A cell is a geographical area where radio coverage is provided by the radio base station at a base station site. Each cell is identified by an identity within the local radio area, which identity is broadcast in the cell. The base stations communicate with the devices that are within range of the base stations.

The communications network may further include any additional network nodes suitable to support communication between devices. Such additional network nodes may be e.g. a Radio Network Controller (RNC), a Serving GPRS Support Node (SGSN), a Mobility Management Entity (MME) etc. GPRS is short for General Packet Radio Service.

In such a communication system, data needs to be sent in two directions, i.e. both in uplink (UL) (from the user device to the network node, also denoted reverse link) and in downlink (DL) (from the network node to the user device, also denoted forward link). There are different ways, or schemes, of controlling a two way transmission of data. Such schemes may e.g. be half duplex or full duplex. A half duplex transmission is a transmission in two directions, wherein the transmission is possible only in one direction at a time. In a full duplex transmission, sometimes also referred to as duplex transmission, the transmission may be sent in both directions simultaneously. In order to be able to transmit in both directions, a device and/or a base station must have a duplex scheme. There are two forms of duplex that are commonly used, namely Time-division duplexing (TDD) and Frequency-division duplexing (FDD). Some communication systems use only TDD or only FDD, and some use both TDD and FDD.

In FDD, the simultaneous transmission and reception of signals is achieved using two different frequencies. FDD makes it possible to transmit and receive signals simultaneously in time as the receiver is not tuned to the same frequency as the transmitter. FDD transmissions require a certain duplex distance between the transmitter and receiver frequencies and a duplex gap between transmit and receive bands. Such duplex distance and gap are required to separate uplink and downlink channels to avoid interference between uplink and downlink within the FDD band. It may also be necessary to provide a frequency gap, i.e. guard band, within or immediately adjacent to the FDD downlink and/or uplink frequencies to prevent interference towards other services using adjacent frequency bands.

TDD uses only a single carrier frequency and such transmission scheme shares the channel between transmission and reception, spacing them apart by multiplexing the two signals on a time basis. In TDD data transmissions are effectuated transmitting a burst of data in each direction. TDD requires a guard time or guard interval between transmission and reception to ensure that the transmission and reception, within a TDD channel, do not collide and/or interfere. The guard time must be chosen so as to allow sufficient time for the signals travelling from the transmitter to arrive at the receiver before a transmission in the reverse direction is started at said receiver and thus avoids this receiver being inhibited from receiving the transmission. In some scenarios, the data traffic in the two directions is not balanced. There may be more data traffic travelling in the downlink direction of the communication system than in the uplink direction. This means that, ideally, the capacity should be greater in the downlink direction. Using a TDD system, it is possible to change the downlink to uplink data capacity ratio; it can be adjusted dynamically by changing the number of time slots allocated to each direction.

In Long Term Evolution (LTE), TDD is being deployed in several frequency bands globally. Some of the frequency operating bands have been allocated to several operators without any guard bands in between, e.g. in the 2.6 GHz range in Europe. In the current LTE standard it is implicitly assumed that adjacent carrier frequencies in TDD networks are synchronized in order to substantially reduce the unwanted emissions between the carrier frequencies. However it is not an obvious matter of course that competing operators will agree to synchronize their network.

Today, TDD operation has only been demonstrated in a single-operator environment within an operating band, but multi-operator deployment is expected within few years. As mentioned, synchronization between the networks of different operators can typically not be assumed.

The need for synchronization between different operators also implies that the operators must employ the same uplink-downlink configuration on all frequency carriers in order to avoid interfering operation. Further, any data traffic asymmetry in uplink/downlink is then assumed to be the same for all operators, which need not be true and which poses a serious restriction for TDD in general. Without synchronization (including uplink/downlink alignment), guard bands are needed between the operator frequency blocks/bands in order to ensure low interference between networks. However, this reduces the spectral efficiency. In case a TDD network is operated in a band adjacent to an FDD band, guard bands are always needed (FDD-TDD synchronization is not possible as the uplink/downlink configuration cannot be the same).

Users require that the services provided by the operators have high quality, in particular that the services are provided without disruption and with high data rate. The operators thus face difficulties in satisfying the demanding users, e.g. due to the above synchronization need when trying to provide interference free channels and the limited communication resources when trying to provide high data rates.

SUMMARY

A particular objective of embodiments herein is therefore to overcome at least one of the above disadvantages and to provide improved communication between a network node and a device in a communication network. More particularly, embodiments herein relate to the utilization of a guard band between TDD carriers, notably possibly unsynchronized TDD carriers. Further, embodiments herein also relate to a FDD carrier in a different (adjacent) operating band.

Increasing the utilization of the otherwise non-used parts of guard bands and removing or alleviating the restriction of identical uplink-downlink configuration on all carriers, thereby allowing simultaneous transmission and reception in adjacent blocks, would be beneficial for the procurement of TDD. The teachings herein presents and relates to such increase of frequency band and improvements for TDD.

The object is according to a first aspect achieved by a method performed in a network node for configuring a device for radio communication in uplink and downlink between the network node and the device. The method comprises: configuring the device with a primary cell on a first radio channel at a first carrier frequency with a first frequency bandwidth for time division duplexed communication in uplink and downlink; configuring the device with a secondary cell on a second radio channel at a second carrier frequency with a second frequency bandwidth, wherein the secondary cell is adjacent to the primary cell and configured for downlink communication only, and configuring the device to support and to monitor the second radio channel, the configuration comprising a priority list according to which the device is to perform the monitoring.

By enabling the device to receive downlink data on the secondary cell, the secondary cell in particular comprising parts of the earlier unused guard band, operators are enabled to offer higher downlink data rates for the devices.

The object is according to a second aspect achieved by a network node for configuring a device for radio communication in uplink and downlink between the network node and the device. The network node comprises a processor and memory, the memory containing instructions executable by the processor, whereby the network node is operative to: configure the device with a primary cell on a first radio channel at a first carrier frequency with a first frequency bandwidth for time division duplexed communication in uplink and downlink; configure the device with a secondary cell on a second radio channel at a second carrier frequency with a second frequency bandwidth, wherein the secondary cell is adjacent to the primary cell and configured for downlink communication only; and configure the device to support and to monitor the second radio channel, the configuration comprising a priority list according to which the device is to perform the monitoring.

The object is according to a third aspect achieved by a method performed in a device for radio communication in uplink and downlink with a network node. The device is configured for time division duplexed communication in uplink and downlink with the network node at a primary cell on a first radio channel at a first carrier frequency with a first frequency bandwidth. The method comprises receiving configuration information comprising: information about a secondary cell on a second radio channel at a second carrier frequency with a second frequency bandwidth, wherein the secondary cell is adjacent to the primary cell and configured for downlink communication only, and information to support and to monitor the second radio channel, the information comprising a priority list according to which the device is to perform the monitoring.

The object is according to a fourth aspect achieved by a device for radio communication in uplink and downlink with a network node. The device is configured for time division duplexed communication in uplink and downlink with the network node at a primary cell on a first radio channel at a first carrier frequency with a first frequency bandwidth. The device comprises a processor circuit and memory, the memory containing instructions executable by the processor, whereby the device is operative to receive configuration information comprising: information about a secondary cell on a second radio channel at a second carrier frequency with a second frequency bandwidth, wherein the secondary cell is adjacent to the primary cell and configured for downlink communication only, and information to support and to monitor the second radio channel, the information comprising a priority list according to which the device is to perform the monitoring, and be configured in accordance with the received configuration information.

Further features and advantages of the present teachings will become clear upon reading the following description and the accompanying drawings.

DETAILED DESCRIPTION

Figure 1:
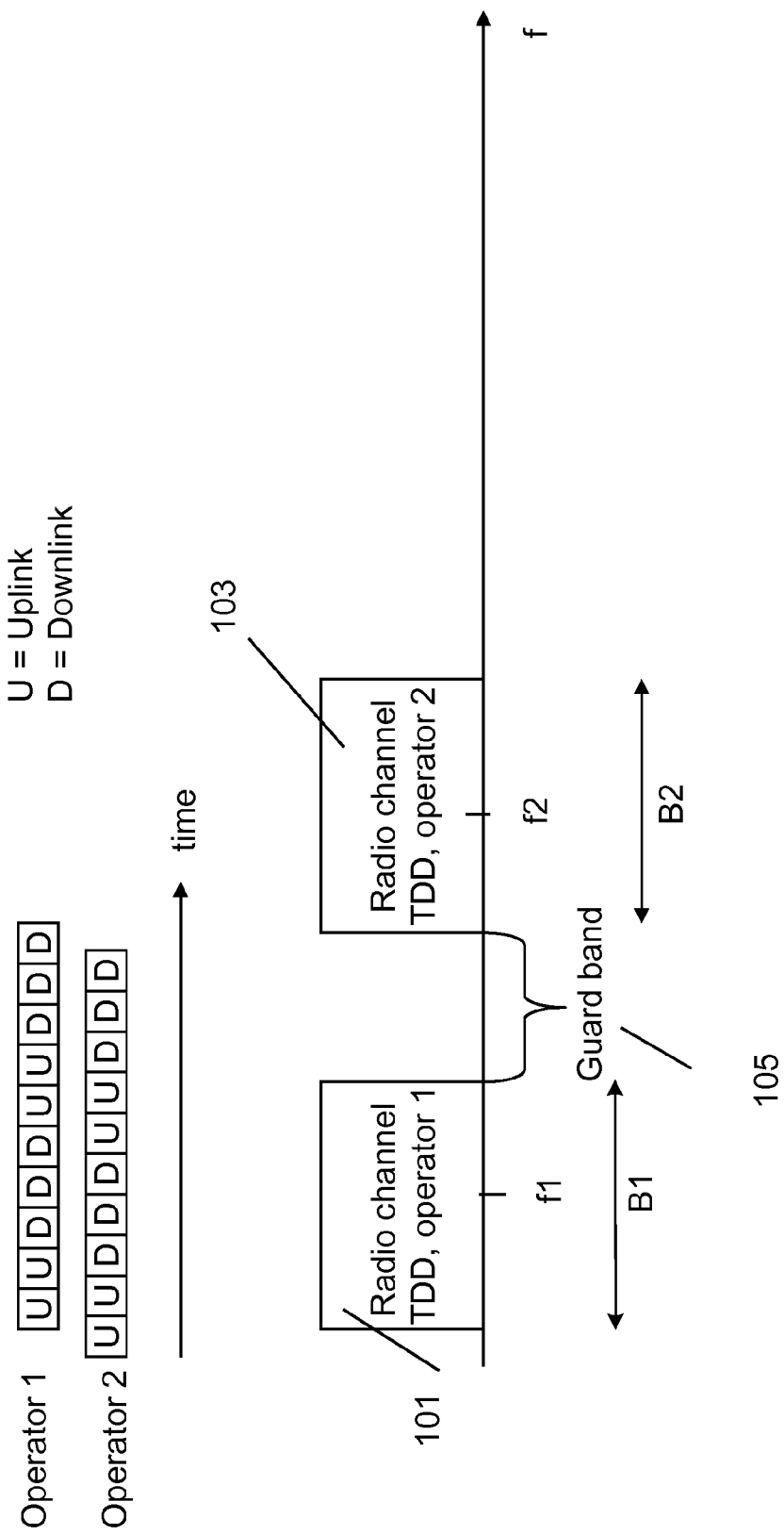
FIG. 1 is a schematic drawing illustrating deployment of two operators operating intra-band with unsynchronized TDD operation.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Unsynchronized operation requires a frequency separation between adjacent carrier frequencies, i.e. a guard band. The guard band required between unsynchronized carrier frequencies within an operating frequency band is determined by the frequency separation required for coexistence between user devices in different carrier frequencies in case transmission is scheduled in one carrier frequency and reception in another carrier frequency. This frequency separation is today set to have the same order of magnitude as the system bandwidth. The frequency separation required for coexistence between network nodes, such as base stations, may be considerably smaller as will be described later.

As mentioned earlier, to increase the utilization of otherwise non-used parts of guard bands and to remove or alleviate the restriction of identical uplink-downlink configuration on all carriers, would allow simultaneous transmission and reception in adjacent blocks, which in turn would be beneficial for the procurement of TDD. To meet this desire, the present teachings challenges the commonly accepted system design criteria of using a guard band having a bandwidth of the same order of magnitude as the system bandwidth.

The "original" guard band, which thus is of the same order of magnitude as the system bandwidth, is dimensioned in view of the risk of two user devices interfering with each other. The teachings herein, wherein parts of the formerly unused "original" guard band is indeed used, is partly owing to the realization that the user device, being provided with less sophisticated transceivers and other electronics than the network node, interferes with other user devices to a larger extent than the network node interferes with other network nodes. This is due to that network nodes do not have the same size and/or power constraints and therefore may utilize more sophisticated transceiver equipment creating less interference (and therefore requires smaller guard bands as mentioned above).

According to aspects and embodiments disclosed herein, a Secondary cell (Scell) is introduced, which can be seen as and denoted a "booster carrier" in multi-carrier system, e.g. multi-carrier LTE or dual-cell High Speed Packet Access (HSPA) systems. The Scell, or booster carrier, is configured for transmission in the downlink direction only and is deployed within the original guard band between TDD frequency carriers. Thereby the capacity for downlink transmission in the communications system is increased. The Scell can also be seen as and denoted secondary component carrier (SCC).

The network node configures the device, having dual cell (dual carrier) capability, to monitor the Scell on the downlink carrier frequency. That is, to monitor a control channel Physical Downlink Control Channel (PDCCH) or similar, in all downlink sub-frames except sub-frames in which the device has an uplink grant, e.g. for transmission of Physical Uplink Shared Channel (PUSCH), or where the device needs to transmit Hybrid automatic repeat request (HARQ) feedback, e.g. on Physical Uplink Control Channel (PUCCH), on a Primary cell (Pcell), i.e. ordinary TDD band/carrier. The Pcell can also be seen as and denoted primary component carrier (PCC). The network node can inform/configure the device with a priority list which comprises information about when the device should listen to the Scell on the downlink Control CHannel (CCH) and when it should transmit in the uplink, for instance when the device should transmit Channel Quality Indicator (CQI) reports and when it should monitor the Scell. The device operates according to configured information from the network node. CQI is a report or message that provides the network node with information about the downlink channel quality as experienced by the device and may comprise for example a carrier level Received Signal Strength Indication (RSSI), signal to noise/interference ratio (SNR/SIR), a recommended Modulation and Coding scheme (MCS) to use, a Block Error Rate (BLER) or a Bit Error Rate (BER).

Owing to the deployment of the Secondary cell (Scell) (i.e. a multi carrier) configured for transmission in the downlink only in the guard band between the TDD carrier frequencies and bandwidths, and owing to the fact that the device operates according to configuration information from the network node, the communication is improved.

FIG. 1 is a principal illustration of how two unsynchronized operators may deploy unsynchronized TDD radio channels. The term radio channel used herein can also be denoted communication channel, transmission/reception channel etc. The x-axis of FIG. 1 represents the frequency, e.g. measured in MHz. A first operator, Operator 1, has allocated a radio channel 101 at a carrier frequency f1 with a bandwidth of B1. Similarly, a second operator, Operator 2, has allocated radio channel 103 at a carrier frequency f2 with a bandwidth of B2. The two operators are operating within one system frequency band, hence called intra-band operation. As can be seen in the FIG. 1, there is a need for a guard band 105 between the operators' radio channels 101, 103 in order for the transmissions/receptions not to be interfered. In the illustrated example, the radio channels comprise TDD transmission channels, and the transmission scheme of Operator 1 and Operator 2 is exemplified as two uplink time slots, three downlink timeslots, two uplink time slots, three downlink timeslots etc.

Figure 2:
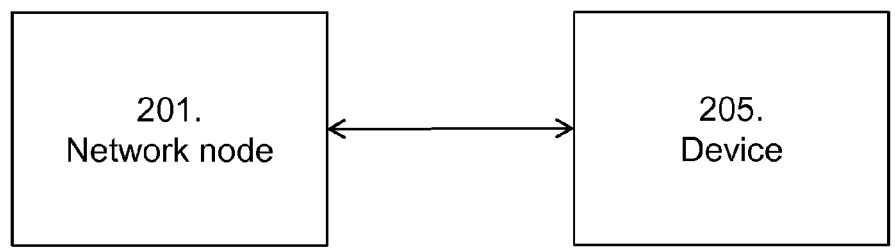
FIG. 2 is a schematic block diagram illustrating embodiments of a communications network.

FIG. 2 depicts a communications network 200 in which embodiments herein may be implemented. The communications network 200 may in some embodiments apply to one or more radio access technologies (RATs) such as for example LTE, LTE Advanced, Wideband Code Division Multiple Access (WCDMA), High Speed Packet Access (HSPA), Global System for Mobile Communications (GSM), or any other Third Generation Partnership Project (3GPP) radio access technology, or other radio access technologies such as e.g. Wireless Local Area Network (WLAN).

The communications network 200 comprises a network node 201. The network node 201 may be a base station such as a NodeB, an eNodeB, or a Radio Network Controller (RNC), Serving GPRS Support Node (SGSN), Mobility Management Entity (MME) or any other network unit capable of communicating, directly or via intermediate network nodes, over a radio carrier with a device 205. The network node 201 will be referred to as NW node 201 in some of the drawings.

The device 205 is a device by which a subscriber may access services offered by an operator's network and also services outside the operator's network, but to which the operator's radio access network and core network provide access, e.g. access to the Internet. The device 205 may be any device, mobile or stationary, enabled to communicate over a radio channel in the communications network, for instance, but not limited to, user equipment, mobile phone, smart phone, modem, sensors, meters, vehicles, household appliances, medical appliances, media players, cameras, machine to machine (M2M) device or any type of consumer electronic, for instance but not limited to television, radio, lighting arrangements, tablet computer, laptop or PC. The device 205 may be portable, pocket storable, hand held, computer comprised, or vehicle mounted devices, enabled to communicate voice and/or data, via the radio access network, with another entity, such as another device or a server. In the following such device is denoted user device.

It should be noted that the communication links in the communications network 200 may be of any suitable kind including wired (e.g. backhaul links between network nodes) and/or wireless links. The link may use any suitable protocol depending on type and level of layer (e.g. as indicated by the OSI model) as understood by the person skilled in the art.

Figure 3:
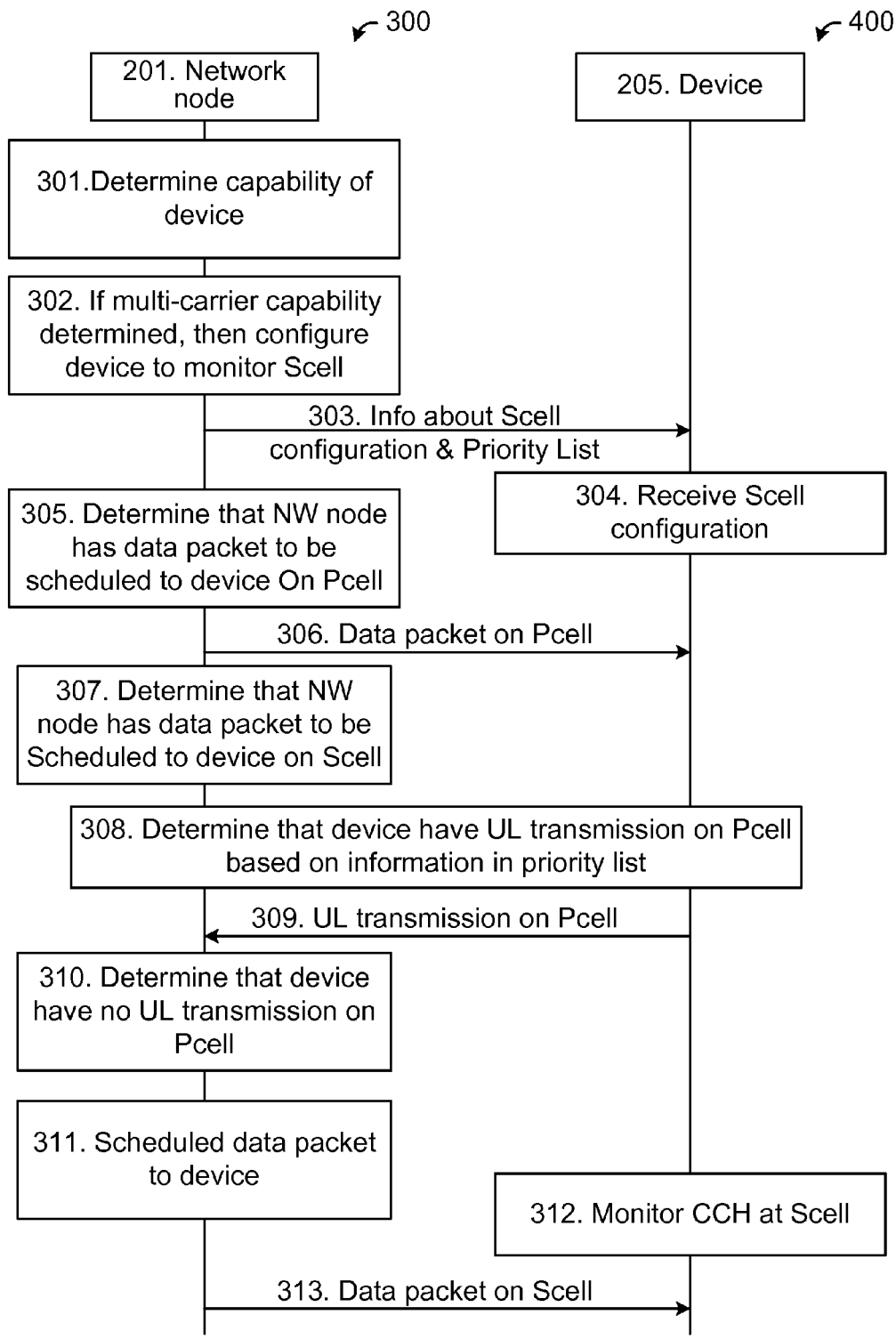
FIG. 3 is a signaling diagram illustrating embodiments of a method in the communications network.
Figure 4:
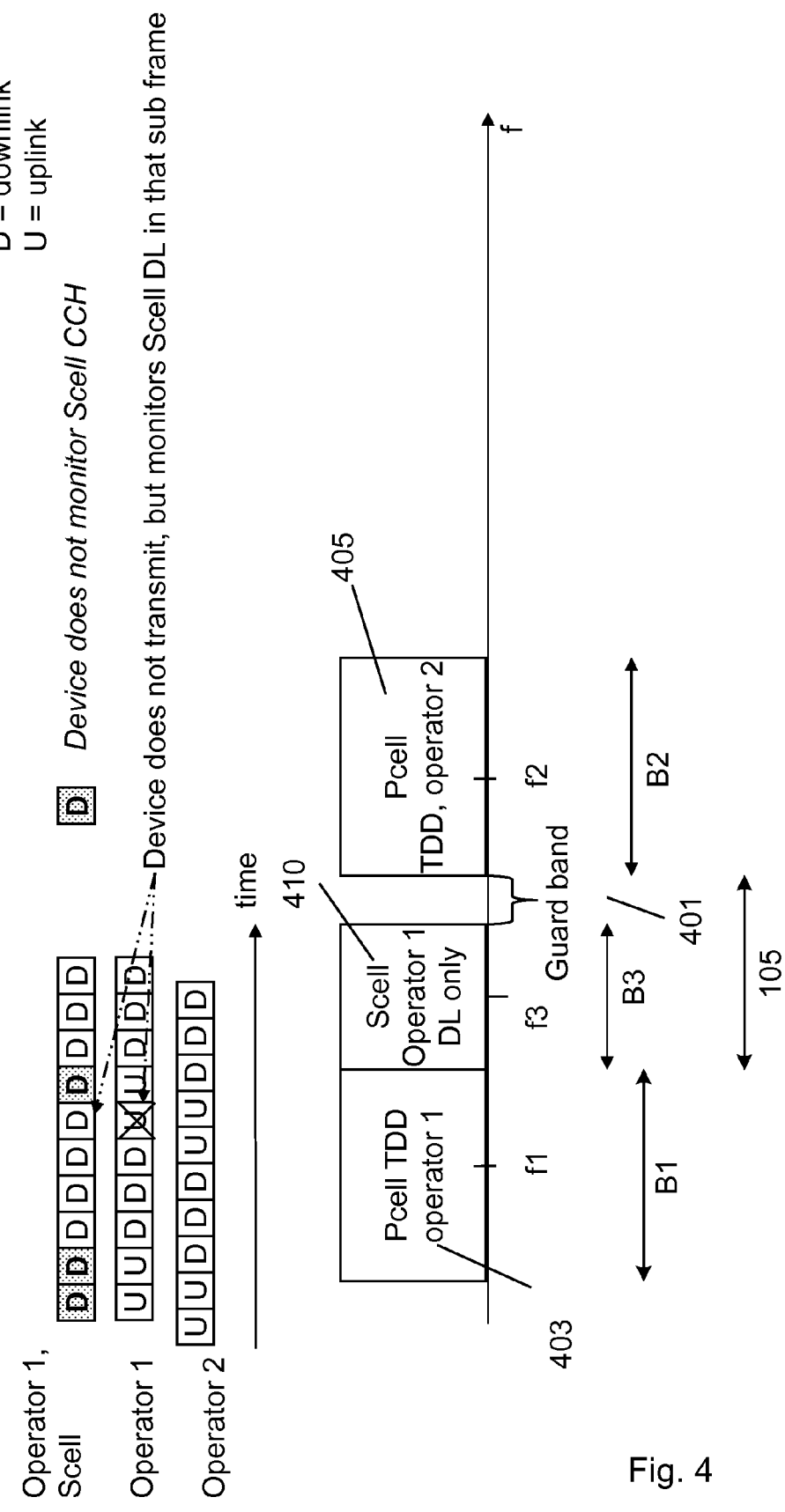
FIG. 4 is a schematic drawing illustrating an example of a TDD band deployment according to embodiments of the present disclosure.

A procedure or methods 300, 400 for providing communication between the user device 205 and the network node 201, according to some embodiments will now be described with reference to the signaling diagram depicted in FIG. 3 and with reference to FIG. 4 illustrating the TDD band. The method 300 comprises the following steps, which steps may be carried out in any other suitable order than described below. It is noted that the procedure may be seen as multiple methods 300, 400; one method 300 (in various embodiments) performed in the network node 201 and one method 400 (in various embodiments) performed in the device 205. For example, when the network node sends a data packet it may be seen as a step of a method performed in the network node 201, while when the device 205 receives the transmitted data packet, it may be seen as a step of a method performed in the device 205.

Step 301

The network node 201 determines the capability of the device 205, by e.g. receiving capability information from the device 205. If there is a capability for dual-carrier (multi-carrier) operations, the network node 201 configures the device 205 by allocating a TDD primary cell (Pcell) (for both UL and DL transmissions) on a primary radio channel with a primary carrier frequency and a primary bandwidth for uplink transmissions of data traffic from a device 205 to the network node 201 and for downlink transmission of data traffic from the network node 201 to the device 205. This may be seen as the network node 201 configuring the device 205 with a primary cell (Pcell) on a first radio channel at a first carrier frequency f1 with a first frequency bandwidth B1 for time division duplexed communication in uplink and downlink.

Furthermore, the network node 201 allocates a secondary cell (Scell) in a secondary radio channel with a secondary carrier frequency and a secondary bandwidth for the downlink transmission of data traffic from the network node 201 to the device 205. The Scell radio channel (abbreviated Scell in the following) is configured as a downlink only radio channel/cell and it is located adjacent to the TDD Pcell. The TDD Pcell and the Scell are associated with the same operator, e.g. operator 1 as exemplified in FIG. 4. This may be seen as the network node 201 configuring the device 205 with a secondary cell 410 on a second radio channel at a second carrier frequency f3 with a second frequency bandwidth B3, wherein the secondary cell 410 is adjacent to the primary cell 403 and configured for downlink communication only.

The Pcell and the Scell may be seen as neighboring cells or radio channels in the frequency domain, i.e. put on adjacent carrier frequencies wherein no one is transmitting between the radio channels of Pcell and Scell. For example, as seen in FIG. 4, operator 1 has on a first carrier a TDD frequency carrier with 3 downlink transmissions and 2 uplink transmissions every 5 sub-frames (a typical LTE configuration).

In the original, prior art guard band 105 between operator 1's TDD Pcell radio channel 403 with bandwidth B1 and operator 2's TDD Pcell 405 with bandwidth B2, the network node 201 has allocated a Scell 410 downlink only radio channel with carrier frequency f3 and bandwidth B3 for operator 1. This may also be referred to as intra-band carrier aggregation with a downlink only band in between two TDD cells (both UL and DL), once the Scell is configured as an "add on" to the Pcell, where "intra" refers to using a single system frequency bandwidth, e.g. the 900 MHz frequency band.

The TDD primary cell 403 laying in the primary carrier frequency may also be referred to as a TDD first cell. Correspondingly, the TDD secondary cell 410 laying in the secondary carrier frequency may also be referred to as a TDD second cell. The guard band 401 may be defined as frequency band or range between adjacent radio channels in that is kept unused to prevent the channels from overlapping and causing crosstalk among modulated signals and to prevent interference between network nodes 201. The guard band 401 separates the two frequency ranges to ensure that operators may transmit simultaneously without interfering each other. It may be used in wireless communications, so that adjacent frequency bands on the same media may avoid interference. The guard band 401 may also be described as a silent band where no transmission takes place.

As mentioned earlier, the present teachings challenge the commonly accepted system design criteria of using a guard band having a bandwidth of the same order of magnitude as the system bandwidth. In particular, it has been identified herein that the network node 201, e.g. a base station, actually does not need the complete guard band 105 illustrated in FIG. 1. The guard band 105 is defined by filter requirements of the device 205. The guard band required for coexistence between network nodes 201, e.g. base stations 201, in different carrier frequencies is significantly smaller since more sophisticated filters, e.g. filters with sharper roll-off, may be used for base station transceivers that do not have the same size and power constraints as the devices 205 typically have.

Typically, the network node 201 can use a more complex, and more power consuming filter and handle interference better compared to filters of the device 205, e.g. by using sub-band filters. The filter parameters in the device 205 are typically constrained with power or cost requirements, and are hence less complex and will not be able to suppress interference from adjacent carrier frequencies to the same extent as a typical network node 201 filter. The network node 201 therefore does not need the complete guard band 105. For example, in a LTE system with 20 MHz system bandwidth, a guard band 105 in FIG. 1 of around 20 MHz is needed due to implementation requirements in the device 205 as mentioned above. However, the inventors of the present application have found that it may be possible to reserve the major part (e.g. 10-15 MHz) 410, as illustrated in FIG. 4, of the complete guard band 105 (also illustrated in FIG. 1), for use by the network node 201 for downlink only transmission, e.g. by configuring the secondary radio channel, Scell 410. The Scell 410 may use e.g. half or three quarter of the guard band, for example 10 MHz or 15 MHz. Hence, in this scenario the needed guard band 401 will be much smaller, in this example e.g. 5 MHz, resulting in an improved spectral efficiency.

The new guard band 401 needed, from the network node's point of view, between DL only Scell 410 and the other operator's Pcell 405 is now much smaller than the guard band 105 (still needed from the devices' point of view).

Carrier aggregation, mentioned above, comprises herein the network node 201 configuration of a DL only Scell 410 together with a TDD Pcell 403. Carrier aggregation may also be referred to as channel aggregation and makes it is possible to utilize more than one carrier. This is a way to increase the overall transmission bandwidth and system capacity, providing the devices 205 with increased data rates. LTE TDD supports carrier aggregation.

Step 302

If a capability for dual-carrier (multi-carrier) operations is determined in step 301, the network node 201 configures the device 205 to start monitoring the Scell 410. Furthermore, the network node 201 determines a priority list or information according to which the device 205 is to perform the monitoring of the Scell 410. The priority list or information may comprise information about when the device 205 should monitor the control channel (CCH) associated with the Scell 410, for example, PDCCH or similar in LTE. The monitoring of CCH may be done in sub-frames when uplink transmission does not have higher priority. That is, the CCH on the Scell 410 should be monitored by the device 205 not only in the TDD Pcell 403 downlink sub-frames, but also in TDD Pcell 402 uplink sub-frames, when the device 205 is not performing any uplink transmission or when the Scell 410 CCH monitoring have higher priority than the uplink transmission. The priority list may in some embodiments be configurable, e.g. could be changed e.g. in the time scale of some seconds. It may be changed in dependence on events in the communication, for example depending on handover events, UL or DL load in the cell, type of data and type of service used by the device.

Alternatively, the priority list or similar, may be defined by a standard specification.

The priority list hence defines when to prioritize monitoring of the control channel (e.g. CCH) of the Scell 410. For example, the priority list may define that the Scell 410 downlink control channel should be monitored in all sub-frames except in sub-frames where the TDD Pcell 403 uplink transmission (from the device 205) has higher priority. Examples of such higher priority cases, which have higher priority over monitoring the Scell control channel, comprise, but are not limited to:
(a) the device 205 has an uplink grant for a sub-frame;
(b) the device 205 should transmit an HARQ feedback in the UL in a sub-frame;
(c) the device 205 should transmit a CQI report in the UL in a sub-frame.

In some embodiments, however, (c) might have lower priority than monitoring the Scell 410 control channel (e.g. CCH). In such case, CQI has only higher priority in case CQI is transmitted at the same time as an HARQ feedback or in case a valid uplink grant (i.e. (a) or (b) are applicable), or if the time since last CQI report is larger than a threshold (the threshold is defined by standard or configured by the network node 201).

In yet another embodiment the priority might be adapted and changed on the fly, making Scell 410 CCH monitoring having higher priority than an uplink grant. For example, consider when important large downlink messages or data need to be transmitted to a device. In that case, the signaling of priority is made on Radio Resource Control (RRC) or via Media Access Control (MAC) signaling, according to well defined procedures according to the standard.

Step 303

The network node 201 transmits the information about the Scell configuration to the device 205. The information comprises instructions which configure the device 205 and information of the priority list.

Step 304

The device 205 receives the information about the Scell 410 configuration from the network node 201. Thus, the device 205 is configured to monitor the Scell 410 and the device 205 is also provided with the priority list according to which the device 205 will perform the monitoring of the Scell 410.

Step 305

The network node 201 determines that it has data packets to be transmitted to the device 205 on the TDD Pcell 403.

Step 306

The network node 201 transmits the data packets in the DL to the device 205 on the TDD Pcell 403. The device 205 receives the data packets on the TDD Pcell 403 and handles them accordingly.

Step 307

The network node 201 determines that is has data packets to be transmitted to the device 205 on the Scell 410. This determination to utilize the Scell 410 can be made when there is more data to be transmitted to a particular device 205 than what is possible to allocate on the Pcell taking other devices' resource needs into account.

Step 308

When the network node 201 has data packets to be transmitted to the device 205 on the Scell 410, the network node 201 checks whether the device 205 has an uplink transmission, based on the information in the priority list, on the TDD Pcell 403 at the time T=t. When the device 205 has a prioritized uplink transmission on the TDD Pcell 403 at the time T=t, the network node 201 postpones the DL transmission of the data packets on the Scell 410 to a later time, e.g. until the time t=t+1. If the device 205 does not have any prioritized uplink transmission on the TDD Pcell 403 at the time T=t, the method proceeds to step 310.

Step 309

The device 205 transmits its data on the uplink on the TDD Pcell 403 at the time T=t. The device 205 as well as the network node 201 knows when uplink transmission is made, since the device 205 could only (e.g. in LTE) transmit data when there is an uplink grant on the uplink shared channel, e.g. physical uplink shared channel (PUSCH). Furthermore, transmission timing of HARQ feedback or CQI on e.g. the physical uplink control channel (PUCCH) is also well defined; HARQ is based on HARQ timing (i.e. ACK/NAK should be transmitted according to well defined rules in the applicable standard after reception of a data packet), and CQI according to pre-configuration from the network node 201. When the device 205 has an uplink transmission, it should not monitor the Scell 410, as illustrated in FIG. 4 by dotted boxes. The network node 201 receives the data packets on the TDD Pcell 403 and processes it accordingly.

Step 310

This step 310 may be performed instead of steps 308 and 309, i.e. in situations when the device 205 does not have any data for uplink transmission based on information in the priority list on the TDD Pcell 403 at T=t. Alternatively, the step 310 may be performed after step 309, i.e. in the case when the network node 201 has postponed the downlink transmission on the Scell 410 until after the uplink transmission, e.g. until the time t=t+1. The network node 201 transmits data packets to the device 205 on the Scell 410, when the network node 201 determines 310 that the device 205 has no uplink transmission on the TDD Pcell 403.

Step 311

The network node 201 schedules the data packet to the device 205 on the Scell 410, e.g. at the time T=t.

Step 312

The device 205 monitors 312 the CCH at the Scell 410. This is also illustrated in the example of FIG. 4 by the thicker box with the letter D.

Step 313

The network node 201 transmits the data packet to the device 205 on the Scell 410, e.g. at time T=t or at time t=t+1. The device 205 receives the data packets on the Scell 410 and processes it accordingly.

Figure 5:
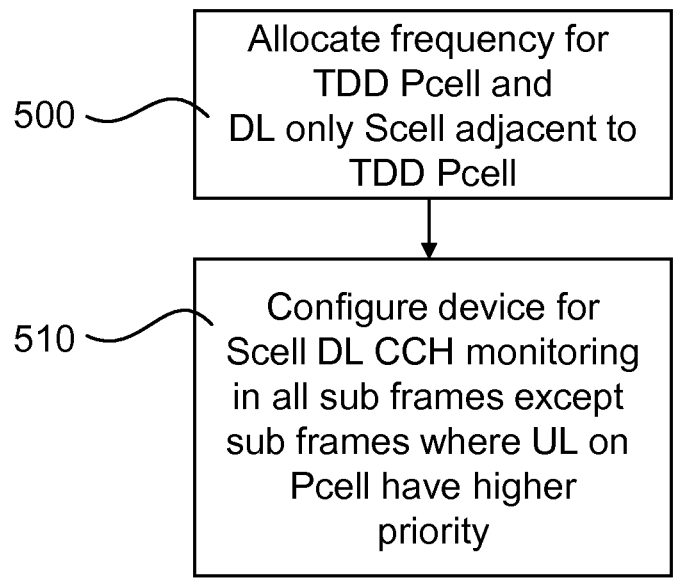
FIG. 5 is a flow chart illustrating embodiments of a method in the network node.

The procedure or method(s) described above will now be described from the perspective of the network node 201. FIG. 5 is a flowchart describing the method in the network node 201. The method comprises steps to be performed by the network node 201, which steps may be performed also in any suitable order, besides the order described below:

Step 500

This step corresponds to steps 301 and 302 in FIG. 3. The network node 201 allocates a TDD Pcell 403 for UL and DL transmissions on a TDD carrier frequency and a Scell 410 on a TDD carrier frequency which is carrier frequency for a downlink transmission only and substantially adjacent to the TDD Pcell 403 and its TDD carrier frequency.

Step 510

This step corresponds to step 303 in FIG. 3. The allocating device (allocator), i.e. the network node 201, configures the device 205, connected to the network node 201 and capable to handle simultaneous first and second carrier connection (Dual cell/dual carrier devices 205). The network node 201 configures the device 205 for Scell DL CCH monitoring as well as with a priority list, that defines when to prioritize Scell 410 monitoring of the control channel (e.g. CCH), and hence to monitor the Scell 410 downlink control channel in all sub-frames except sub-frames where the TDD Pcell 403 uplink transmission (from the device 205) has higher priority. Examples of such higher priority cases have been discussed in relation to FIG. 3.

Figure 6:
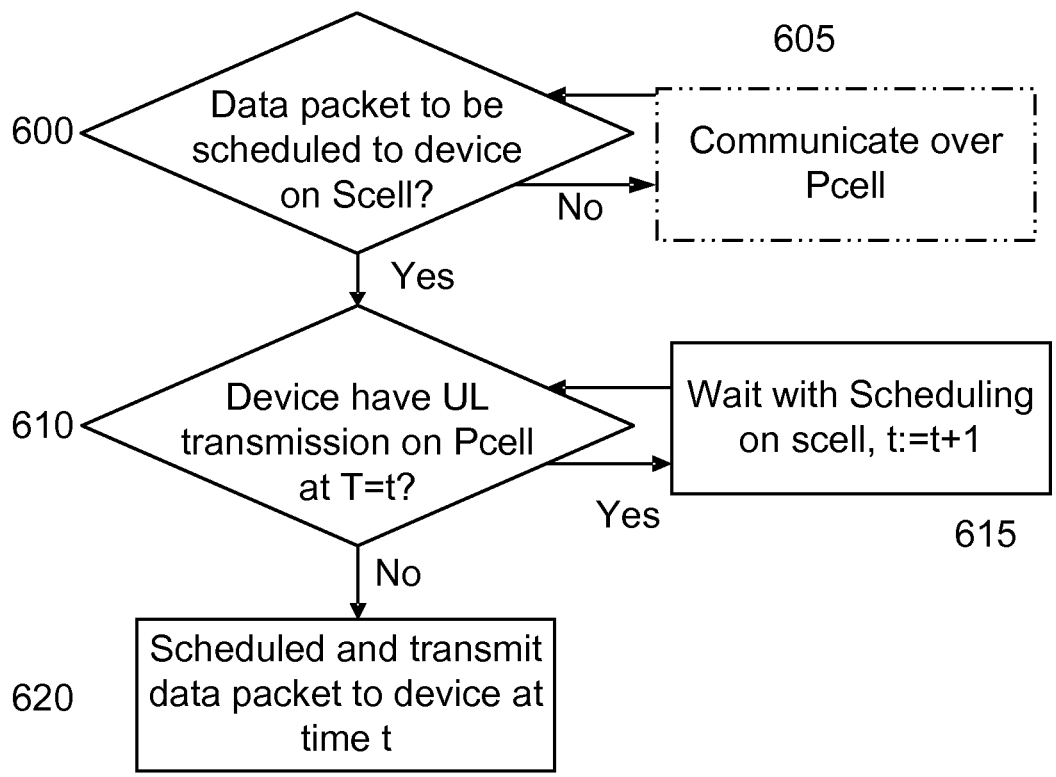
FIG. 6 is a flow chart illustrating embodiments of a method in the network node.

FIG. 6 is a flowchart describing a method in the network node 201. The method comprises the further steps to be performed by the network node 201, which steps may also be performed in any suitable order, besides the one described below:

Step 600

This step corresponds to steps 305 and 308 in FIG. 3. The network node 201 determines whether there are any data packets to be transmitted in the DL to the device 205 on the Scell 410.

Step 605

This step corresponds to step 306 in FIG. 3. When the network node 201 has determined in step 600 that there are no data packets to be transmitted to the device 205 on the Scell 410, the communication to the device 205 is made over the TDD Pcell 403.

Step 610

This step corresponds to step 308 in FIG. 3. When the network node 201 has determined in step 600 that there are data packets to be transmitted in DL to the device 205 on the Scell 410, the network node 201 (or a control unit or processor circuit within the network node 201) determines whether an uplink transmission is expected from the device 205, e.g. at time t. This point of time t is known by the network node 201 from the standard of the communication protocol. For instance, in LTE, the device 205 may only transmit at time (sub-frame) t if it has previously received an uplink grant from the network node 201. The uplink grant was transmitted from the network node 201 some time earlier, e.g. at least 4 ms earlier. Furthermore, the device 205 should transmit HARQ feedback associated with received data packets from the network node 201 a time after reception of a data packet, e.g. at least 4 ms after. This is also known by the network node 201 transmitting the data packet. The device 205 might transmit CQI reports at time instants configured by the network node 201, and hence such transmission times are known by the network node 201. All this together with the priority list as described above makes it possible for the network node 201 to determine whether the device 205 should make an uplink transmission, e.g. at a time T=t.

Step 615

This step corresponds to steps 308 and 309 in FIG. 3. This step 615 is performed when the network node 201 has determined in step 610 that an uplink transmission is expected from the device 205, e.g. at time t. The network node 201 delays the DL transmission of the data packet on the Scell.

Step 620

This step corresponds to step 311 and 313 in FIG. 3. This step is performed when the network node 201 has determined in step 610 that an uplink transmission is not expected from the device 205, e.g. at time t. The network node 201 schedules the data packet on the Scell 410 to the device 205 at time T=t. In the data scheduling the network node 201 also transmits information to the device 205 on the CCH (PDCCH or similar) of the data packet transmitted e.g. the Physical Downlink Shared Channel (PDSCH), or similar.

Figure 7:
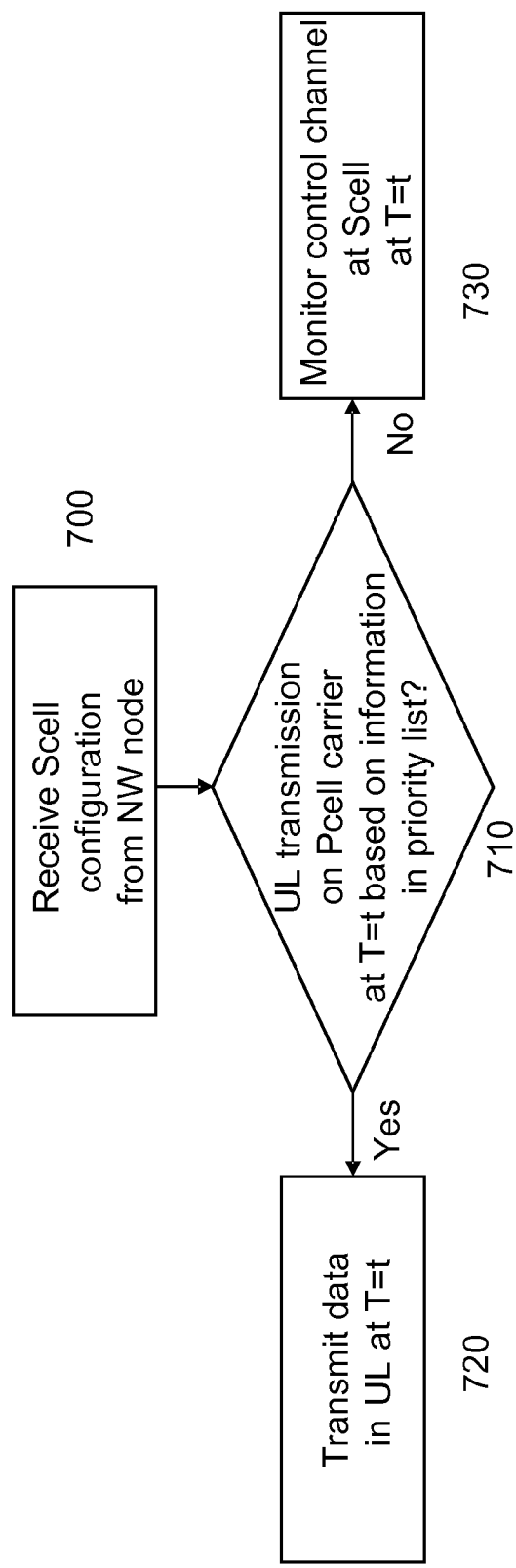
FIG. 7 is a flow chart illustrating embodiments of a method in the device.

The method described above will now be described from the perspective of the device 205. FIG. 7 is a flowchart describing the method in the device 205. The method comprises steps to be performed by the device 205, which steps may also be performed in any suitable order, besides the one described below:

Step 700

This step corresponds to step 304 in FIG. 3. The device 205 receives the Scell 410 configuration information from the network node 201 as well as the priority list that defines when to prioritize Scell 410 monitoring of the control channel (e.g. common control channel, CCH) over the uplink transmission according to the priorities described above.

Step 710

This step corresponds to step 308 in FIG. 3. The device 205 determines whether an uplink transmission on the TDD Pcell 403 (TDD carrier) is to be made, e.g. at T=t.

Step 720

This step corresponds to step 309 in FIG. 3. When the device 205 determined in step 710 that an uplink transmission on the TDD Pcell 403 is to be made, the device 205 transmits data (or HARQ Feedback, CQI) on the carrier frequency associated with the TDD Pcell 403 according to defined rules.

Step 730

This step corresponds to step 312 in FIG. 3. When the device 205 has determined in step 710 that no uplink transmission on the TDD Pcell 403 is to be made, the device 205 monitors the control channel on the Scell 410, e.g. at time T=t. In the general case the device 205 is checking the priority list, determines whether the UL transmission has higher priority than the Scell control channel (CCH) monitoring, and if not, the device 205 monitors the control channel on the Scell 410, e.g. at time T=t.

Figure 8A:
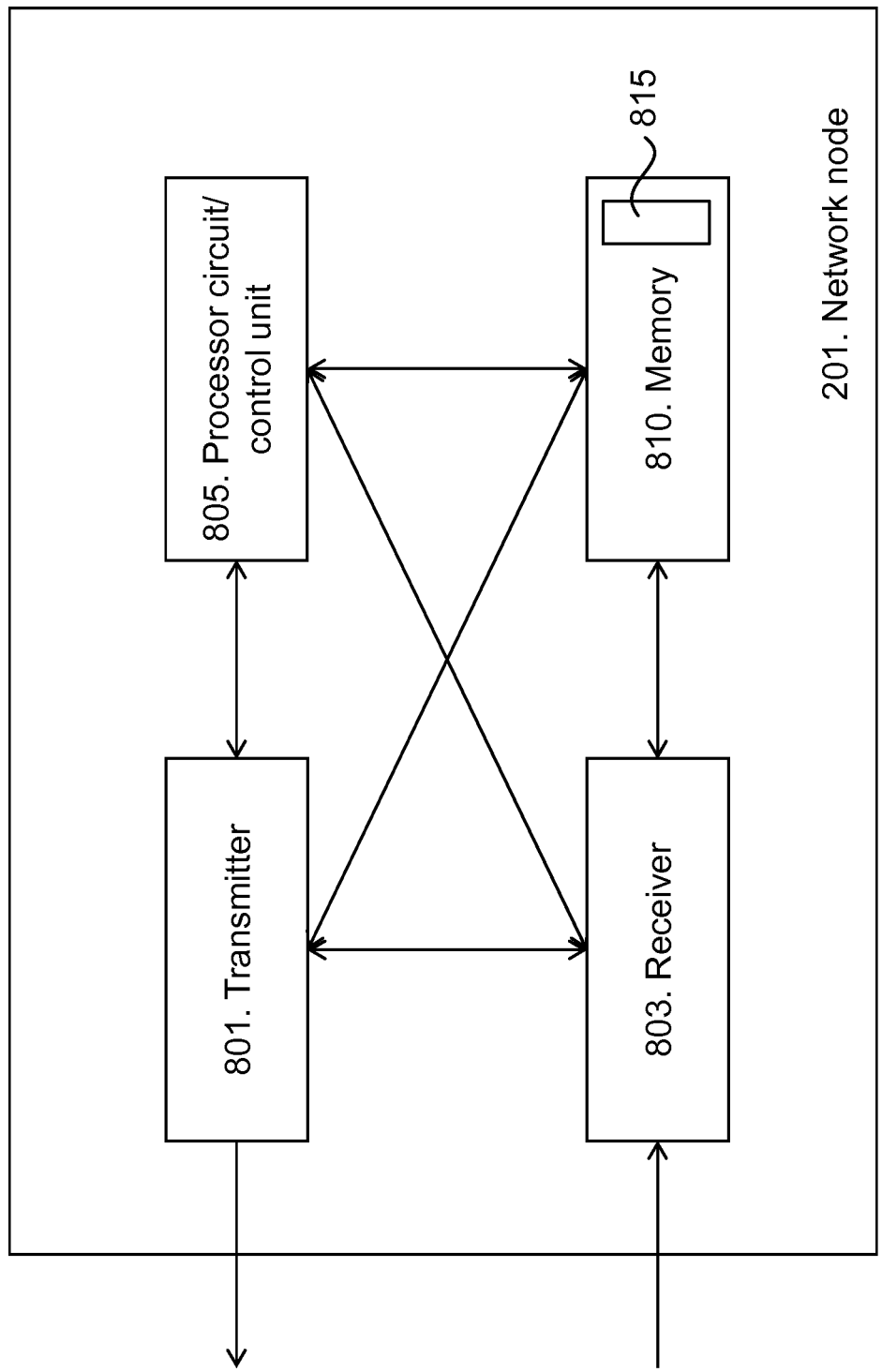
FIG. 8a is a schematic block diagram illustrating embodiments of a network node.

To perform the method steps shown in FIGS. 5 and 6 the network node 201 comprises an arrangement as shown in FIG. 8a. The network node 201 comprises a transmitter 801, a receiver 803, a memory 810 and a processor, processor circuit or control unit 805. In some embodiments, some or all of the functionality described above as being provided by network node 201 or other forms of the network node 201 may be provided by the processor circuit 805 executing instructions stored on a computer-readable medium, such as the memory 810 shown in FIG. 8a. For example, a computer program 815 may be provided, comprising instructions executable by the processor circuit 805. Alternative embodiments of the network node 201 may comprise additional components beyond those shown in FIG. 8a that may be responsible for providing certain aspects of the network node's 201 functionality, including any of the functionality described above and/or any functionality necessary to support the embodiments described herein.

The transmitter 801 and the receiver 803 described above may refer to a combination of analog and digital circuits, and/or one or more processor circuits configured with software and/or firmware, e.g. stored in the memory 810, that when executed by the one or more processor circuits such as the processor circuit 805 perform as described above. One or more of these processor circuits, as well as the other digital hardware, may be included in a single application-specific integrated circuit (ASIC), or several processor circuits and various digital hardware may be distributed among several separate components, whether individually packaged or assembled into a system-on-a-chip (SoC).

Figure 9A:
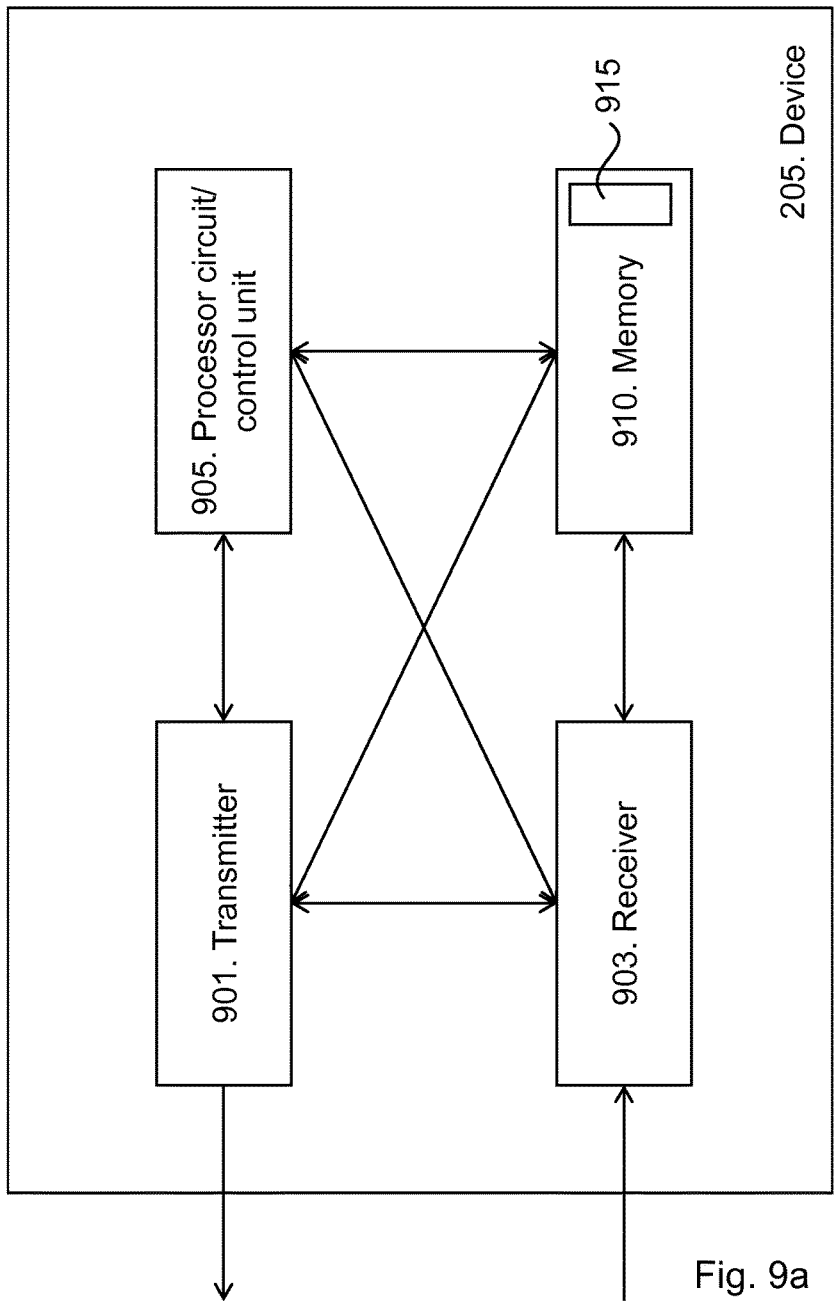
FIG. 9a is a schematic block diagram illustrating embodiments of a device.

The memory 810 comprises one or more memory units. The memory 810 is arranged to be used to store data, received data streams, power level measurements, configuration information, data packets to be transmitted and that has been received, the priority list, information about the Scell 410 and the TDD Pcell 403, information about operator 1 and operator 2, threshold values, time periods, configurations, schedulings, and applications to perform the methods herein when being executed in the network node 201. To perform the method steps shown in FIG. 7 the device 205 comprises an arrangement as shown in FIG. 9a. The device 205 comprises a transmitter 901, a receiver 903, and a memory 910, and a processor or processor circuit or control unit 905. In some embodiments, some or all of the functionality described above as being provided by device 205 or other forms of the device 205 may be provided by the processor circuit 905 executing instructions stored on a computer-readable medium, such as the memory 910 shown in FIG. 9a. For example, a computer program 915 may be provided, comprising instructions executable by the processor 905. Alternative embodiments of the device 205 may include additional components beyond those shown in FIG. 9a that may be responsible for providing certain aspects of the device's 205 functionality, including any of the functionality described above and/or any functionality necessary to support the embodiments described herein.

The transmitter 901 and the receiver 903 described above may refer to a combination of analog and digital circuits, and/or one or more processor circuits configured with software and/or firmware, e.g. stored in the memory 910, that when executed by the one or more processor circuits such as the processor circuit 905 perform as described above. One or more of these processor circuits, as well as the other digital hardware, may be included in a single application-specific integrated circuit (ASIC), or several processor circuits and various digital hardware may be distributed among several separate components, whether individually packaged or assembled into a system-on-a-chip (SoC).

The memory 910 comprises one or more memory units. The memory 910 is arranged to be used to store data, received data streams, power level measurements, configuration information, data packets to be transmitted and that has been received, the priority list, information about the Scell 410 and the TDD Pcell 403, information about operator 1 and operator 2, threshold values, time periods, configurations, schedulings, and applications to perform the methods herein when being executed in the device 205.

Figure 10A:
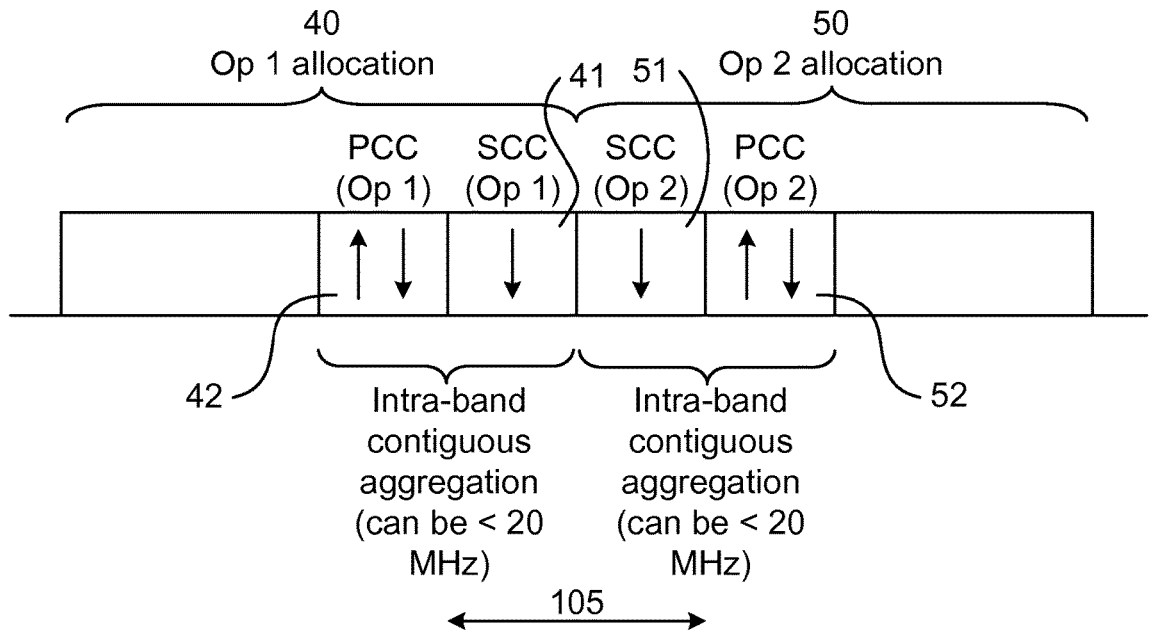
FIGS. 10*a* and 10*b* are a schematic drawing illustrating deployment of two operators operating intra-band with unsynchronized operation.
Figure 10B:
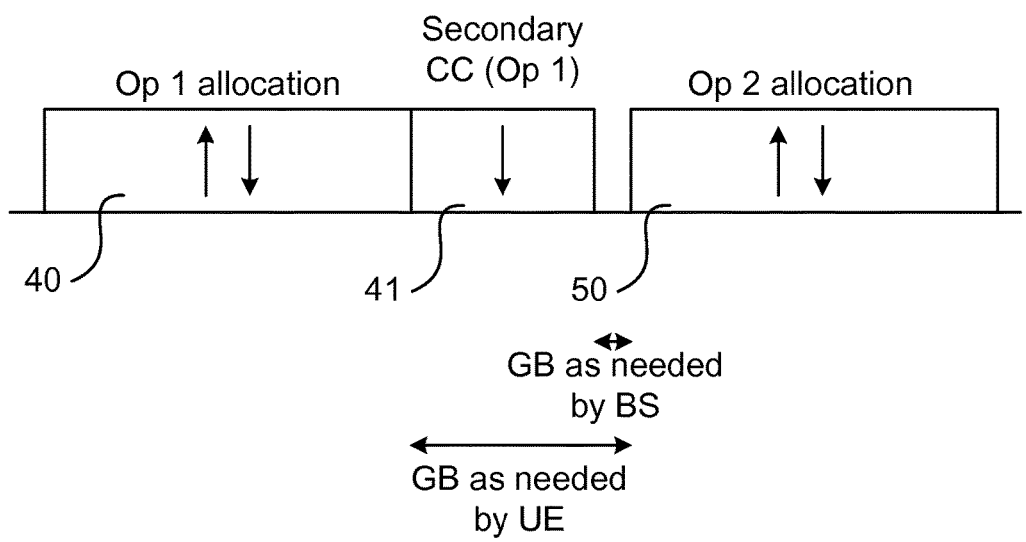

In a further improvement of the spectral efficiency, the present teachings provide still other embodiments, based on the teachings to be described next with reference to FIGS. 10a and 10b. FIGS. 10a and 10b are schematic drawings illustrating deployment of two operators operating intra-band with unsynchronized operation.

As has been described earlier, the present teachings address the guard band need, and in particular leaves the commonly accepted practice that the guard band should be set to have a bandwidth of the same order of magnitude as the system bandwidth. Hitherto embodiments have been described wherein only one operator was illustrated as providing a secondary cell.

The teachings described so far comprises an UL/DL boundary between the operators as illustrated e.g. in FIG. 4, to avoid the situation wherein a DL transmission of a network node (NW node) of the first operator may interfere with a UL reception of a NW node of the second operator. The NW node may for example be a base station (BS), as is used as illustrative example in the following.

This small guard band is motivated by BS-BS compatibility, the guard band allowing the second operator's BS receive filter roll-off, thus preventing blocking from the first operator BS, for example if the base stations are co-sited. The guard band further allows the first operator BS transmitter filter roll to reduce out-of-band emissions into the second operations BS reception.

Further, for device-device compatibility the guard band as dictated by the BS requirements is far too small, e.g. as the devices have no cavity filters with sharp roll-off. Therefore it has been commonly accepted that a carrier component received by a device in the first operator's network can be interfered by a device in the second operator's network. The interference may for example comprise out-of-band emissions from the device of the second operator. However, the device-device interference typically only occurs when these are in close proximity to each other (stochastic interference), whereas the BS are typically at fixed locations, so the interference is always present.

In FIGS. 10a and 10b, an arrow pointing upward indicates an UL communication and an arrow pointing downwards indicates a DL communication.

In FIG. 10a a first operator, Op 1, and a second operator, Op2, both provide secondary cells, as opposed to the situation described with reference e.g. to FIGS. 4 and 10b, wherein only one operator is illustrated as providing a secondary cell. In embodiments of FIG. 10a, there is no such UL-DL boundary at all between the first and second operators, so the BSs may use its standard filters. This situation is similar to and can be compared with two neighboring FDD operators in the FDD DL band.

FIG. 10a illustrates the frequency allocation 40 of a first operator Op1 and the frequency allocation 50 of a second operator Op2. The first operator provides a secondary component carrier (SCC) 41 (also denoted Scell previously) in DL only. Also the second operator provides such SCC 51 in DL only. The guard band of prior art is indicated at reference numeral 105 (compare FIG. 1), and is thus in this embodiment eliminated entirely.

A primary component carrier (PCC) 42 (also denoted Pcell previously) of the first operator is within the frequency allocation 40 of the first operator and adjacent the SCC 41 of the first operator, i.e. intra-band aggregation with the DL only SCC/Scell 41.

Correspondingly, a PCC/Pcell 52 of the second operator is within the frequency allocation 50 of the second operator and adjacent the SCC 51 of the second operator, i.e. intra-band aggregation with the DL only SCC 51.

Thus, in all embodiments, i.e. both with reduced guard band compared to hitherto known guard bands as well as those without any guard band at all, instead of allocating a large guard band between unsynchronized operators, the guard band is used for Scell (or SCC) DL only transmissions. The DL only transmissions may be either one-sided (compare with FIG. 4, FIG. 10b) with accepted interference from a device in the network of the second operator into DL only of the first operator. The DL only transmission may alternatively be bilateral (compare with FIG. 10a) by allocating a Scell each in the guard band. In the latter case there is no need for any guard band, but the uplink transmissions should still be well separated to reduce mutual device interference. The interference on the Scell of the first operator in the situation of FIG. 4 may be accepted, since the device also has a Pcell of the first operator, and this Pcell should be well separated from the UL of the second operator.

In yet another scenario, and with reference still to FIG. 10b, one of the frequency allocations, e.g. frequency allocation 50, is within an FDD band. In such scenario, an FDD operating band is allocated close or adjacent to a TDD operating band (with a small or no frequency separation). This normally requires a guard band between the FDD and TDD operators as there is typically no synchronization between the networks with the different duplex arrangements (i.e. FDD and TDD, respectively). In FIG. 10b, the frequency allocation 50 may thus be either an FDD downlink band or an FDD uplink band. With respect to the teachings herein, the FDD downlink and uplink can be viewed as a TDD carrier with all time slots allocated in either of the respective downlink or uplink directions, and no time slots allocated in the respective opposite direction.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods, without departing from the embodiments herein, be performed in another order than the order in which they appear.

EXAMPLE EMBODIMENTS

1. A method to deploy a frequency spectrum and to configure a device 205 for radio communication, the method comprising
    allocating primary radio channel 403 at a primary carrier frequency (f1) with a primary frequency bandwidth B1 for TDD (UL and DL) communication between a network node 201 and the device 205;
    allocating a secondary radio channel 410 at secondary carrier frequency f3 with a secondary frequency bandwidth B3, wherein the secondary radio channel is adjacent to the primary radio channel 403 and used for downlink communication from the network node 201 to the device 205; and
    configuring the device 205 for support the secondary radio channel and wherein the network node transmits a priority list to the device, the priority list including information of when to monitor a control channel on the secondary channel 410 at UL sub-frames (for the primary radio channel (403)) and when to perform an UL transmission from the device 205 to the network node 201 on the primary radio channel 403.

2. The method according to embodiment 1, wherein the priority list includes information that an UL grant or a HARQ feedback from the device to the network node each has higher priority than monitoring of a control channel on the secondary radio channel 410.

3. The method according to embodiment 1 or 2, wherein the priority list includes information that CQI reports from the device to the network node have lower priority than monitoring of the control channel on the secondary radio channel 410.

4. The method according to embodiment 3, wherein CQI reports from the device to the network node have lower priority when only the CQI reports is transmitted (i.e. where there is no simultaneous UL grant or HARQ feedback).

5. The method according to any of the embodiments 1 to 4, where a reconfiguration message with other prioritization information or an updated priority list can be transmitted from the network node 201 on event basis to the device(s) 205.

Network Node/Scheduling Unit 201

6. A network node 201 configured to be in communication (transmission in the DL, reception in the UL) with a device 205 via a primary radio channel 403 using TDD communication and a secondary radio channel 410 used for DL transmission to the device, method and apparatus to schedule data to the device 205 on the secondary radio channel 410 comprising:
    determining whether the device 205 will have an UL transmission in a future first time instant (e.g. a sub-frame) according to defined priorities configurations (or via information in a priority list) and earlier scheduled data packets; and
    if not, then schedule DL data to the device 205 on the secondary radio channel 410 in the future first time instant.

Device (205)

7. A device 205 configured to be in communication (transmission in the UL, reception in the DL) with a network node 201 via a primary radio channel 403 using TDD communication and a secondary frequency band 410 used for DL reception, method and apparatus to monitor DL reception on the secondary radio channel 410 comprising:
- receiving configuration information from the network node 201 (about secondary radio channel (410));
- determining whether the device 205 has an UL transmission at a future first time instant (e.g. sub-frame) according to received priorities (e.g. as defined in a priority list), configurations and earlier received data packets;
- if not, then monitoring a control channel on the secondary radio channel 410 at the future first time instant.

Figure 11:
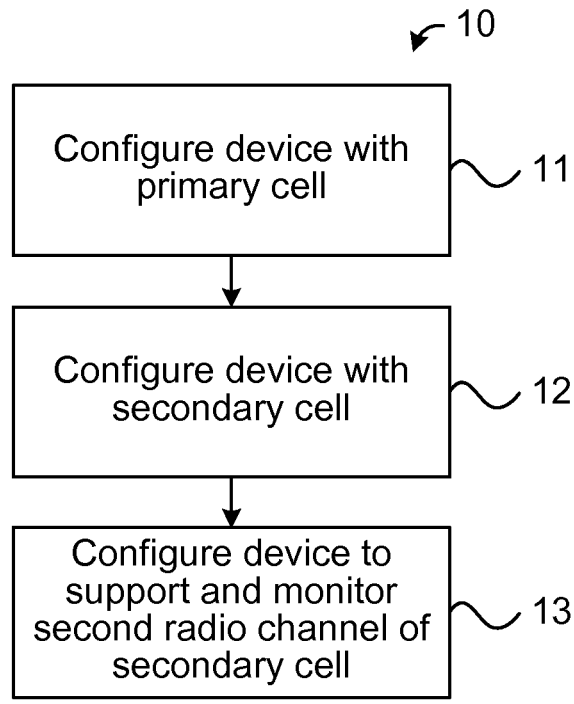
FIG. 11 is a flow chart illustrating steps of a method performed in a network node in accordance with an embodiment.

FIG. 11 illustrates a flow chart over steps of a method 10 in a network node in accordance with the present teachings and in line with the description as provided hitherto.

The method 10 (compare 300 of FIG. 3) is performed in a network node 201 for configuring a device 205 for radio communication in uplink and downlink between the network node 201 and the device 205. The method 10 comprises configuring 11 (also compare 301, 500 of FIGS. 3 and 5) the device 205 with a primary cell 403 on a first radio channel at a first carrier frequency f1 with a first frequency bandwidth B1 for time division duplexed communication in uplink and downlink.

The method 10 further comprises configuring 12 (also compare 301, 500 of FIGS. 3 and 5) the device 205 with a secondary cell 410 on a second radio channel at a second carrier frequency f3 with a second frequency bandwidth B3, wherein the secondary cell 410 is adjacent to the primary cell 403 and configured for downlink communication only.

The method 10 further comprises configuring 13 (also compare 303 of FIG. 3) the device 205 to support and to monitor the second radio channel, the configuration comprising a priority list according to which the device 205 is to perform the monitoring.

In an embodiment, the configuring 13 comprises transmitting, to the device 205, the priority list comprising information on when to monitor a control channel on the secondary cell 410 at uplink sub-frames for the primary radio channel 403 and when to perform an uplink transmission from the device 205 to the network node 201 on the primary cell 403.

In an embodiment, the priority list comprises information that an uplink grant or a HARQ feedback from the device 205 to the network node 201 each has higher priority than monitoring of a control channel on the secondary cell 410.

In an embodiment, the priority list comprises information that channel quality indicator (CQI) reports from the device 205 to the network node 201 have lower priority than monitoring of the control channel on the secondary cell 410.

In a variation of the above embodiment, the CQI reports from the device 205 to the network node 201 have lower priority when only the CQI reports are transmitted.

In an embodiment, the method 10 comprises transmitting, to the device 205, a reconfiguration message with other prioritization information or an updated priority list on an event basis.

In an embodiment, the method 10 comprises:
- determining that there are data packets to be transmitted to the device 205 on the secondary cell 410,
- determining whether the device 205 has an uplink transmission pending at a future first time instant, and
- transmitting, on the secondary cell 410, the data packet to the device 205 at the future first time instant if it is determined that there are no pending uplink transmission and at a postponed time instant for cases determined to have a pending uplink transmission.

With reference again to FIG. 8a, the present teachings also encompass the network node 201. In particular, FIG. 8a illustrates schematically a network node 201 and means for implementing the various embodiments of the method as described. The network node 201, and in particular a processor circuit 805 thereof, is configured for configuring a device 205 for radio communication in uplink and downlink between the network node 201 and the device 205. The network node 201 comprises a processor circuit or control unit 805 and memory 810, the memory 810 containing instructions executable by the processor circuit 805, whereby the network node 201 is operative to perform any of the embodiments of the method 10 as described. In particular, the network node 201 is operative to:
- configure the device 205 with a primary cell 403 on a first radio channel at a first carrier frequency f1 with a first frequency bandwidth B1 for time division duplexed communication in uplink and downlink,
- configure the device 205 with a secondary cell 410 on a second radio channel at a second carrier frequency f3 with a second frequency bandwidth B3, wherein the secondary cell 410 is adjacent to the primary cell 403 and configured for downlink communication only, and
- configure the device 205 to support and to monitor the second radio channel, the configuration comprising a priority list according to which the device 205 is to perform the monitoring.

In an embodiment, the network node 201 is further operative to:
- determine whether the device 205 will have an uplink transmission in a future first time instant according to a defined priorities configurations and earlier scheduled data packets; and
- schedule downlink data to the device 205 on the secondary cell 410 at the future first time instant if the device (205) is determined to have no uplink transmission in the future first time instant.

In a variation of the above embodiment, the network node 201 is further operative to schedule downlink data to the device 205 on the secondary cell 410 at a postponed time instant following the first time instant if the device 205 is determined to have uplink transmission in the future first time instant.

Figure 8B:
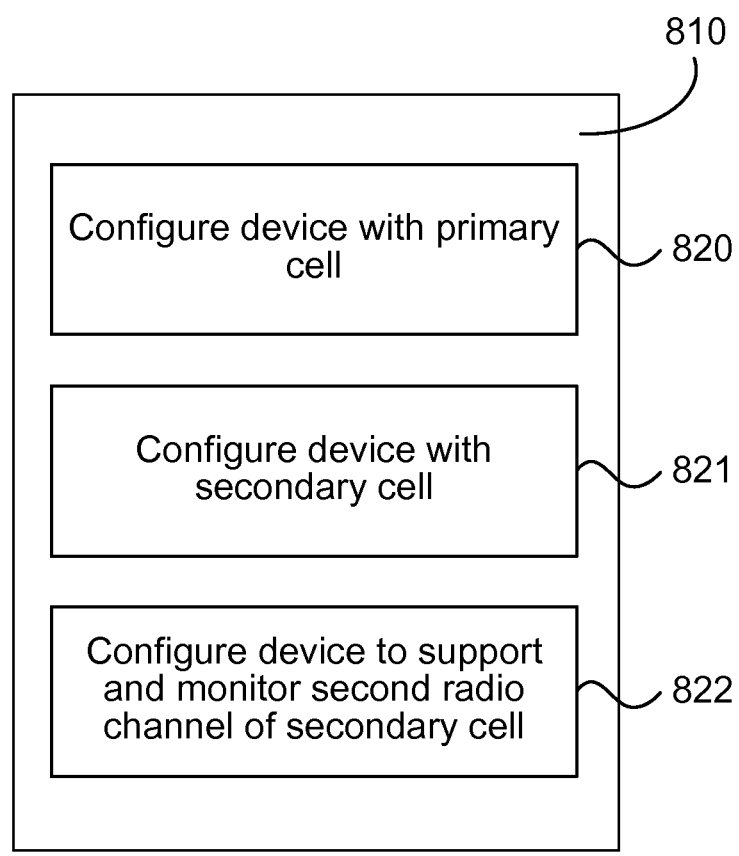
FIG. 8b illustrates a computer program product comprising functions modules/software modules for implementing methods of the present teachings.

With reference still to FIG. 8a and also FIG. 8b, the present teachings also encompass computer programs and computer program products.

The computer program product, e.g. the memory 810, thus comprises instructions executable by the processor circuit 805. Such instructions may be comprised in a computer program 815, or in one or more software modules or function modules.

In an embodiment, illustrated in FIG. 8b, the computer program product, e.g. memory 810, comprises functions modules/software modules for implementing methods as described. The memory 810 may then comprise means, in particular a first function module/software function 820, for configuring the device 205 with a primary cell 403 on a first radio channel at a first carrier frequency f1 with a first frequency bandwidth B1 for time division duplexed communication in uplink and downlink. The memory 810 may comprise means, in particular a second function module/software module 821, for configuring the device 205 with a secondary cell 410 on a second radio channel at a second carrier frequency f3 with a second frequency bandwidth B3, wherein the secondary cell 410 is adjacent to the primary cell 403 and configured for downlink communication only. The memory 810 may comprise means, in particular a third function module/software module 822, for configuring the device 205 to support and to monitor the second radio channel, the configuration comprising a priority list according to which the device 205 is to perform the monitoring.

Figure 12:
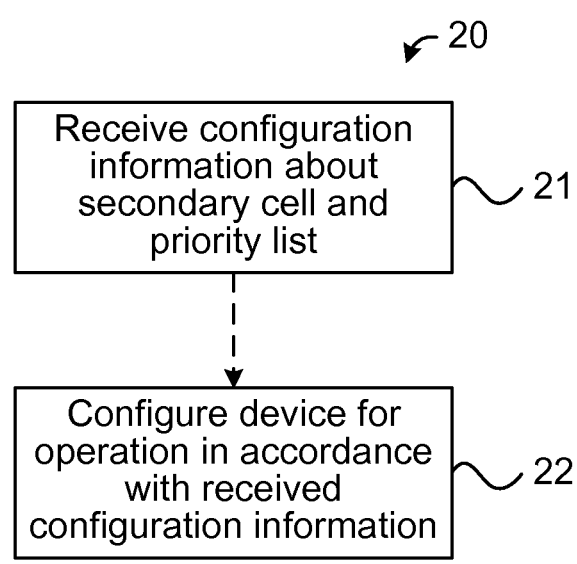
FIG. 12 is a flow chart illustrating steps of a method performed in a device in accordance with an embodiment.

FIG. 12 illustrates a flow chart over steps of a method 20 performed in a device 205 in accordance with the present teachings and in line with the description as provided hitherto.

The method 20 (also compare with FIG. 7) is performed in a device 205 for radio communication in uplink and downlink with a network node 201. The device 205 is configured for time division duplexed communication in uplink and downlink with the network node 201 at a primary cell 403 on a first radio channel at a first carrier frequency f1 with a first frequency bandwidth B1. The method 20 comprises receiving 21 (compare 700 in FIG. 7) configuration information comprising:
information about a secondary cell 410 on a second radio channel at a second carrier frequency f3 with a second frequency bandwidth B3, wherein the secondary cell 410 is adjacent to the primary cell 403 and configured for downlink communication only, and
information to support and to monitor the second radio channel, the information comprising a priority list according to which the device 205 is to perform the monitoring.

In an embodiment, illustrated in FIG. 12 by the dashed arrow, the method 20 comprises configuring 22 (compare 710, 720, 730 of FIG. 7) the device 205 for operation in accordance with the received configuration information.

In an embodiment, the method 20 comprises: determining whether an uplink transmission is scheduled at a future first time instant according to the received priority list; and monitoring a control channel on the secondary cell 410 at the future first time instant if the device 205 is determined to have no uplink transmission in the future first time instant.

With reference again to FIG. 9a, the present teachings also encompass the device 205. In particular, FIG. 9a illustrates schematically a device 205 and means for implementing the various embodiments of the method 20 as described. The device 205 is configured for radio communication in uplink and downlink with a network node 201. The device 205 is configured for time division duplexed communication in uplink and downlink with the network node 201 at a primary cell 403 on a first radio channel at a first carrier frequency f1 with a first frequency bandwidth B1. The device 205 comprises a processor or processor circuit or control unit 905 and memory 910, the memory 910 containing instructions executable by the processor 905, whereby the device 205 is operative to:

receive configuration information comprising:
information about a secondary cell 410 on a second radio channel at a second carrier frequency f3 with a second frequency bandwidth B3, wherein the secondary cell 410 is adjacent to the primary cell 403 and configured for downlink communication only, and
information to support and to monitor the second radio channel, the information comprising a priority list according to which the device 205 is to perform the monitoring,
be configured in accordance with the received configuration information.

In an embodiment, the device 205 is further operative to monitor a control channel on the secondary cell 410 when, according to the priority list, no uplink transmission with higher priority is pending.

In an embodiment, the device 205 is further operative to:
determine whether an uplink transmission is scheduled at a future first time instant according to the received priority list;
monitor a control channel on the secondary cell 410 at the future first time instant if the device 205 is determined to have no uplink transmission in the future first time instant.

With reference still to FIG. 9a, the present teachings also encompass computer programs and computer program products.

The computer program product, e.g. the memory 910, thus comprises instructions executable by the processor 905. Such instructions may be comprised in a computer program 915, or in one or more software modules or function modules.

Figure 9B:
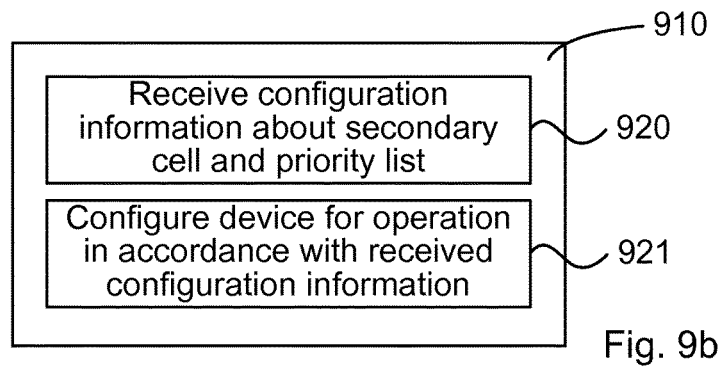
FIG. 9b illustrates a computer program product comprising functions modules/software modules for implementing methods of the present teachings.

In an embodiment, illustrated in FIG. 9b, the computer program product 910 comprises functions modules/software modules for implementing methods as described. The memory 910 may then comprise means, in particular a first function module/software function 920, for receiving the configuration information comprising information about a secondary cell 410 on a second radio channel at a second carrier frequency f3 with a second frequency bandwidth B3, wherein the secondary cell 410 is adjacent to the primary cell 403 and configured for downlink communication only, and information to support and to monitor the second radio channel, the information comprising a priority list according to which the device 205 is to perform the monitoring. The memory 910 may comprise means, in particular a second function module/software module 921, for configuring the device 205 in accordance with the received configuration information.

Embodiments herein afford many advantages, of which a non-exhaustive list of examples follows:

The embodiments herein utilize the guard band needed between unsynchronized TDD carriers in a way that provides the advantage of improving the spectrum utilization and efficiency.

The embodiments herein provide the advantage of increasing the capacity for downlink transmission in the communications system.

A further advantage is an increased overall system capacity as parts of the normal guard band can be utilized to allocate a secondary radio channel in downlink communication only.

The embodiments herein are not limited to the features and advantages mentioned above. A person skilled in the art will recognize additional features and advantages upon reading the above detailed description.

The invention claimed is:

1. A method performed in a network node for configuring a device for radio communication in uplink and downlink between the network node and the device, the method comprising:
configuring the device with a primary cell on a first radio channel at a first carrier frequency with a first frequency bandwidth for time division duplexed communication in uplink and downlink;
configuring the device with a secondary cell on a second radio channel at a second carrier frequency with a second frequency bandwidth, wherein the secondary cell is adjacent to the primary cell and configured for downlink communication only, wherein the secondary cell is deployed within a guard band between time division duplex frequency carriers or within a guard band between time division duplex frequency carrier and frequency division duplex band, and wherein the secondary cell comprises a secondary component carrier; and
configuring the device to support and to monitor the second radio channel, the configuration comprising a priority list according to which the device is to perform the monitoring,
wherein the configuring comprises transmitting, to the device, the priority list, and wherein the priority list comprises information indicating in which uplink sub-frames for the primary radio channel the device is to monitor a control channel on the secondary cell and in which uplink sub-frames for the primary radio channel the device is to perform an uplink transmission from the device to the network node on the primary cell.

2. The method as claimed in claim 1, wherein the priority list comprises information that an uplink grant or a HARQ feedback from the device to the network node each has higher priority than monitoring of a control channel on the secondary cell.

3. The method as claimed in claim 1, wherein the priority list comprises information that channel quality indicator (CQI) reports from the device to the network node have lower priority than monitoring of the control channel on the secondary cell.

4. The method as claimed in claim 3, wherein the CQI reports from the device to the network node have the lower priority when the CQI reports are not transmitted along with other information.

5. The method as claimed in claim 1, comprising transmitting, to the device, a reconfiguration message with other prioritization information or an updated priority list on an event basis.

6. The method as claimed in claim 1, comprising:
determining that there are data packets to be transmitted to the device on the secondary cell;
determining whether the device has an uplink transmission pending at a future first time instant; and
transmitting, on the secondary cell, the data packet to the device at the future first time instant if it is determined that there are no pending uplink transmission and at a postponed time instant for cases determined to have a pending uplink transmission.

7. A network node for configuring a device for radio communication in uplink and downlink between the network node and the device, the network node comprising a processor and memory, the memory containing instructions executable by the processor, whereby the network node is operative to:
configure the device with a primary cell on a first radio channel at a first carrier frequency with a first frequency bandwidth for time division duplexed communication in uplink and downlink;
configure the device with a secondary cell on a second radio channel at a second carrier frequency with a second frequency bandwidth, wherein the secondary cell is adjacent to the primary cell and configured for downlink communication only, wherein the secondary cell is deployed within a guard band between time division duplex frequency carriers or within a guard band between time division duplex frequency carrier and frequency division duplex band, and wherein the secondary cell comprises a secondary component carrier;
configure the device to support and to monitor the second radio channel, the configuration comprising a priority list according to which the device is to perform the monitoring;
determine whether the device will have an uplink transmission in a future first time instant according to a defined priorities configurations and earlier scheduled data packets; and
schedule downlink data to the device on the secondary cell at the future first time instant if the device is determined to have no uplink transmission in the future first time instant.

8. The network node as claimed in claim 7, wherein the network node is further operative to schedule downlink data to the device on the secondary cell at a postponed time instant following the first time instant if the device is determined to have uplink transmission in the future first time instant.

9. A method performed in a device for radio communication in uplink and downlink with a network node, the device being configured for time division duplexed communication in uplink and downlink with the network node at a primary cell on a first radio channel at a first carrier frequency with a first frequency bandwidth, the method comprising:
receiving configuration information comprising:
information about a secondary cell on a second radio channel at a second carrier frequency with a second frequency bandwidth, wherein the secondary cell is adjacent to the primary cell and configured for downlink communication only, wherein the secondary cell is deployed within a guard band between time division duplex frequency carriers or within a guard band between time division duplex frequency carrier and frequency division duplex band, and wherein the secondary cell comprises a secondary component carrier; and
information to support and to monitor the second radio channel, the information comprising a priority list according to which the device is to perform the monitoring;
determining whether an uplink transmission is scheduled at a future first time instant according to the received priority list; and
monitoring a control channel on the secondary cell at the future first time instant if the device is determined to have no uplink transmission in the future first time instant.

10. The method as claimed in claim 9, comprising configuring the device for operation in accordance with the received configuration information.

11. A device for radio communication in uplink and downlink with a network node, the device being configured for time division duplexed communication in uplink and downlink with the network node at a primary cell on a first radio channel at a first carrier frequency with a first frequency bandwidth, the device comprising a processor and memory, the memory containing instructions executable by the processor, whereby the device is operative to:

receive configuration information comprising:
- information about a secondary cell on a second radio channel at a second carrier frequency with a second frequency bandwidth, wherein the secondary cell is adjacent to the primary cell and configured for downlink communication only, wherein the secondary cell is deployed within a guard band between time division duplex frequency carriers or within a guard band between time division duplex frequency carrier and frequency division duplex band, and wherein the secondary cell comprises a secondary component carrier; and
- information to support and to monitor the second radio channel, the information comprising a priority list according to which the device is to perform the monitoring; and be configured in accordance with the received configuration information;

wherein the device is further operative to:

determine whether an uplink transmission is scheduled at a future first time instant according to the received priority list;

monitor a control channel on the secondary cell at the future first time instant if the device is determined to have no uplink transmission in the future first time instant.

12. The device as claimed in claim 11, the device further being operative to:

monitor a control channel on the secondary cell when, according to the priority list, no uplink transmission with higher priority is pending.

\* \* \* \* \*